United States Patent [19]

Gaudio

[11] 4,370,733

[45] Jan. 25, 1983

[54] PATTERN GENERATION SYSTEM

[76] Inventor: John J. Gaudio, P.O. Box 27826, Denver, Colo. 80227

[21] Appl. No.: 205,790

[22] Filed: Nov. 10, 1980

Related U.S. Application Data

[62] Division of Ser. No. 907,685, May 19, 1978, Pat. No. 4,262,338.

[51] Int. Cl.³ .................................... G06F 3/14

[52] U.S. Cl. .................................... 364/900; 340/723; 340/752; 340/789; 340/799

[58] Field of Search ... 364/200 MS File, 900 MS File, 364/515, 518; 340/713, 723, 725, 752, 792, 793, 799, 802, 789

[56] References Cited

U.S. PATENT DOCUMENTS

| | | | |
|---|---|---|---|
| 3,976,982 | 8/1976 | Eiselen | 340/752 |
| 3,999,167 | 12/1976 | Ito et al. | 364/900 |
| 4,024,531 | 5/1977 | Ashby | 340/792 |
| 4,078,253 | 3/1978 | Kajiura et al. | 364/900 |
| 4,181,973 | 1/1980 | Tseng | 364/900 |
| 4,204,208 | 5/1980 | McCarthy | 364/900 |

*Primary Examiner*—Leo H. Boudreau

[57] ABSTRACT

A display system employs electronic components for deriving and supplying display control signals, preferably in the form of multi-bit display control words, to control a display device. The display device is formed of a plurality of individual display units preferably arranged in horizontal rows and vertical columns. Each of the display units is controlled by at least one bit of a multi-bit display control word. Each vertical column of the display device is collectively controlled in whole or in part by one multi-bit display control word. Control and memory elements control the display device in accordance with a plurality of display control words received. The intensity of the display units is controlled by energizing the units in predetermined fractions of the periods of the periodic waveform which energizes the display units. The system includes a system memory for recording and holding a plurality of display control words which define a selected pattern or patterns to be presented. The system may include means for repetitiously accessing in sequential order the display control words defining the pattern, thereby allowing the pattern to be repetitiously presented upon the display. A pattern composition means logically combines two preexisting display control words in separate memory locations and supplies the new display control word resulting from the combination to a third memory location. The composition means is thereby operative to combine a plurality of patterns defined by selected groups of display control words in memory.

4 Claims, 12 Drawing Figures

SOURCE BLOCK A
SOURCE BLOCK B
DESTINATION BLOCK C
EXTERNAL POWER SOURCE
SERIAL MEMORY 100
LATCH 102
GREEN LAMP
RED LAMP
BLUE LAMP
SERIAL CONTROL INTERFACE
data
clock
strobe
clk

PATTERN GENERATION SYSTEM

This is a division of U.S. patent application Ser. No. 907,685, filed May 19, 1978, now U.S. Pat. No. 4,262,338.

BACKGROUND OF THE INVENTION

1. Field of the Invention

This invention relates to display systems of the type in which information is selectively presented. More particularly, this invention relates to an electronic display system for special effects lighting in which a plurality of display units arranged in a predetermined pattern are selectively energized to present special visual effects or information to viewers.

Special effects lighting systems are typically used to augment musical entertainment at concerts, nightclubs, and the like. Normally, special effects lighting systems take input information from music and generate visual patterns in color that in some way correspond or relate to the music. The purpose of these display systems is to add a visual dimension to the audible musical entertainment, especially when the music is prerecorded or no other visual entertainment is provided, such as live performances by artists or musicians.

2. Brief Description of Prior Art

Various types and arrangements of special effects lighting devices are known in the art. One type of prior art device is a translator, which amplifies components of sound at certain selected frequencies or frequency bands, and energizes specific groups of lights or lighting units in proportion to the component of sound amplified. Another type of prior art device is a chaser, which sequentially energizes specific groups of lights. Furthermore, the operating concepts of translators have also been combined with the operating concepts of chasers to secure a combined mode of operation. Devices have been wired with switches to allow an operator to manually select which of several groups of lamps will be effected by specific frequencies or frequency bands, and to select the order of the groups of lamps which will be energized by the chaser. In other situations, groups of lamps have been electrically connected to define specific geometric patterns in specific locations, but these patterns cannot be altered without manually repositioning the lamps and reconnecting the electrical conductors controlling the lamps.

Another prior art system utilizes a matrix system of control over the display units arranged in a matrix. In the matrix control system, one separate conductor is electrically connected to each row of display elements, and another electrical conductor is electrically connected to each vertical column of display units. A single display unit is energized when its row and column conductors are appropriately energized. This arrangement allows any given display unit to be specifically controlled, but by its nature, precludes the energizing of display lamps to form various geometric configurations, such as a diagonal line.

Limitations and considerations relating to prior art display systems, other than those briefly discussed here, may be known or should become more apparent upon recognition of the advantages secured by the present invention, particularly since many prior art limitations and disadvantages can be avoided or overcome, and many of the advantages previously unattainable in the prior art can be obtained, as a result of the present invention.

SUMMARY OF THE INVENTION

Accordingly, it is the general objective of this invention to provide a new and improved display system by which selective and variable control over any individual display unit or multiple display units of the whole display device may be attained. Further objects are to provide a display system which generates a wide variety and complexity of different visual patterns and presentations, and which allows the patterns and presentations to change in color, speed, motion, shape and direction, for example, without appearing disjointed or intermittent in appearance. It is a further object of the invention to provide a system which can, once installed, allow relatively easy selection of the patterns presented. A further object is to provide a display system utilizing electronic components to utilize a selected group of display control signals for controlling the display device while simultaneously supplying new display control signals for controlling the display unit after a preselected time or condition has occurred.

Other objectives of the present invention are to provide a display system which will readily logically combine display control signals defining particular images or sub-images to be presented, and to repeatedly supply a given pattern defined by a group of display control signals. A further object is to exercise selective control over a portion of the display device by supplying new display control signals to that portion of the display device or by causing selected portions of the display device to respond to display control signals.

In accordance with these and other objectives, the present invention generally involves processing means, control and memory means, and display means. The processing means, which may take the form of various microcomputer elements, contains selected processing information, supplies display control signals related in a predetermined manner to the processing information, and exercises general control over the display system. The display control signals are typically a plurality of sequential multi-bit display control words. The control and memory means comprises a first memory level for receiving the display control signals, and a second memory level into which the display control signals are transferred at an appropriate time for providing a desired display. Typically, the first memory level comprises shift registers for receiving bits of the multi-bit display control words forming the display control signals. Typically, the second memory level includes a latch having memory locations for receiving and holding therein the signals applied from the first memory location at a time in which the latch is operatively controlled for this purpose. The display means includes at least one display unit, and each display unit is operatively controlled and energized by the signals supplied from the second memory level. Arranged in this manner, the display control words supplied to the first memory level can be readily changed or shifted in position while the display control signals held in the second memory location are controlling the display conditions of the display units at the display means.

Preferably, the display means comprises a plurality of display units arranged in horizontal rows and vertical columns. Separate first and second level memories are operatively associated with each horizontal row of the display means. Corresponding memory locations in the first and second memory levels are operatively connected to control the display units in vertical columns. A display signal may take the form of a multi-bit display word in which the number of bits in the display control word is equal to the number of horizontal rows in the display. The bits of a multi-bit display control word affect the condition of the display units in a vertical column.

A power waveform having a periodic characteristic is applied to the display means for energizing the display units in accordance with the display control signals controlling the energization of the lighting units. A timing synchronization means supplies timing reference signals related in a predetermined manner to the periodic characteristic of the power waveform. The timing reference signals are utilized by the processing means to control energization of the lighting units both in color and intensity. Intensity is typically controlled by controlling the fractional time period of each period of the periodic power waveform during which the lighting unit is energized.

The display system also includes a system memory having a plurality of addressable memory locations into which the display control signals are received. Under control of the processing means, the display control signals may be retrieved from the system memory for use by elements of the display system. Pattern composition means operatively control the logical combination of various display control signals to effect various logical combinations of patterns defined by blocks of display control words recorded in the system memory. In logically combining two or more patterns, the composition means logically combines corresponding display control words from the two patterns and derives a new display control word.

The display system further includes means for repetitiously accessing and presenting patterns defined by a plurality of display control words recorded in a selected plurality of memory locations in system memory or a pattern memory block. If desired, the first level memory locations can be selectively accessed by the processing means to apply and vary the display control words operatively controlling only a selected portion or pattern of the display.

The features which define the present invention are recited in the appended claims. The features and the various objectives and advantages of the present invention can be better understood from the following description of a presently preferred embodiment taken in conjunction with a drawing consisting of a number of figures.

BRIEF DESCRIPTION OF THE DRAWINGS

FIGS. 7A, 7B and 7C are supplied for illustrating operation of the pattern composition unit shown in FIG. 6.

In certain figures, abbreviations are employed for signal receiving terminals. These abbreviations are "E or e" meaning enable, "w.e." meaning write enable and "c" meaning control. Other abbreviations and conventions will be apparent to those skilled in the art.

DESCRIPTION OF PREFERRED EMBODIMENTS

Figure 1:
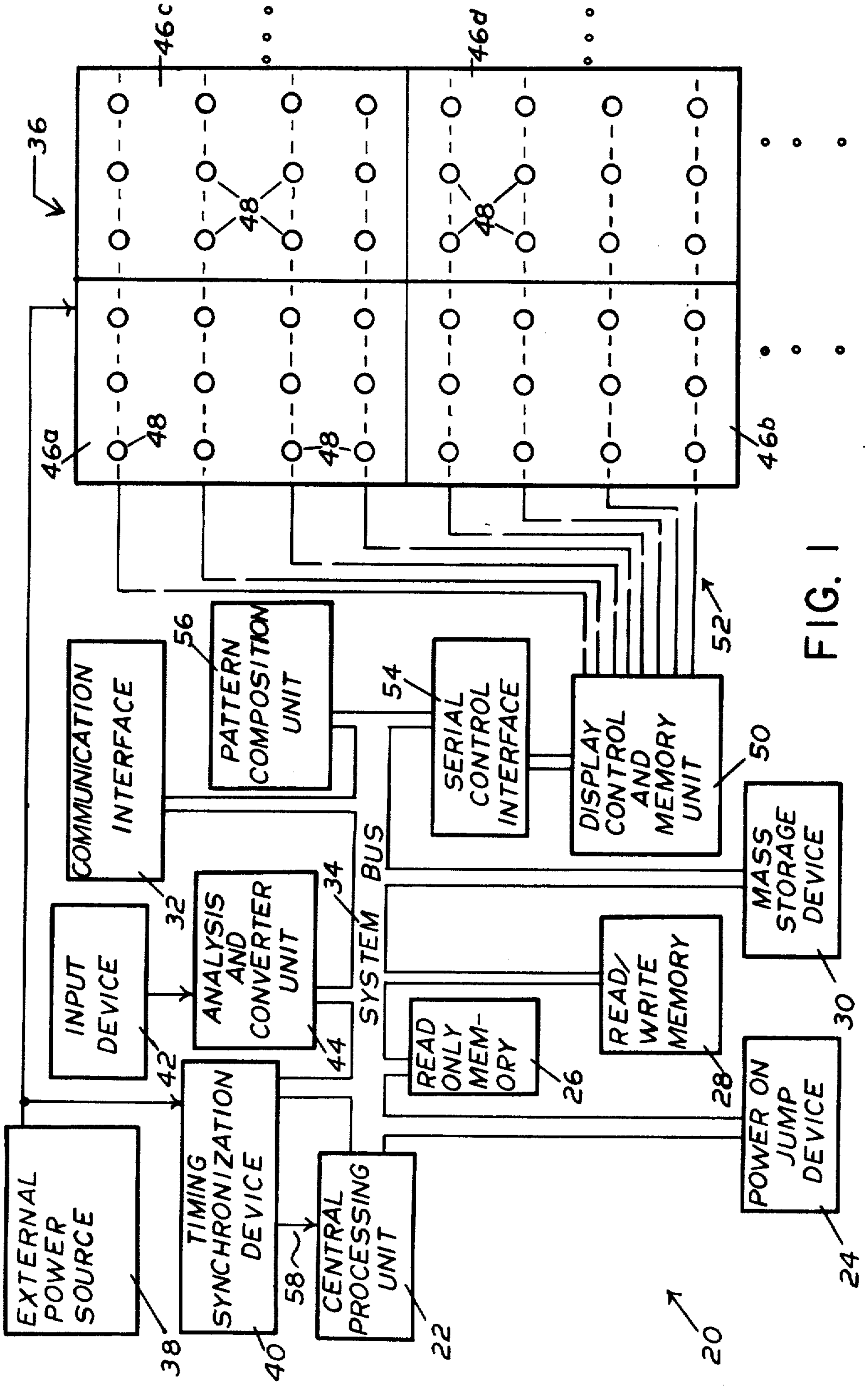
FIG. 1 is a schematic block diagram of a special effects lighting display system illustrating the general aspects of the present invention.

The features and concepts of the display system are embodied in a special effects lighting system 20 illustrated in FIG. 1. The system 20 includes a central processing unit (CPU) 22, a power on jump device 24, a read-only memory 26, a read-write memory 28, mass memory storage device 30, and a communication interface 32. The elements 22–32 are operatively electrically interconnected by a system bus 34. The elements 22 through 30 are conventional elements typically employed in well-known microcomputers. The communication interface 32 includes a conventional keyboard or other elements by which control over the operation of the system 20 may be achieved. In general operation, the application of power to the system 20 causes the power on jump device 24 to signal the central processing unit 22, and the central processing unit causes a prerecorded program in the read-only memory 26 to begin execution. The read-only memory program operatively controls the central processing unit 22 to remove one or more selected prerecorded programs from the mass storage device 30 and record those programs in the read-write memory 28. Upon execution of the programs in the read-write memory 28, the central processing unit 22 operatively controls the remainder of the elements in the system 20 to provide a visual presentation and effect at a display 36.

The system 20 is supplied with an external source of power 38. Power from the power source 38, in the form of a conventional full-wave rectified, unfiltered, alternating current waveform, is supplied to the display 36 for energizing its display elements. The alternating waveform is also supplied to a timing synchronization device 40. Timing reference signals are derived from the applied alternating power waveform by the timing synchronization device 40, and the reference signals are supplied to the system bus 34 and to the central processing unit 22. In its simplest form, the timing sychronization device 40 may take the form of a conventional zero crossing detector providing the timing reference signals each time the periodic waveform from the external power source 38 attains a zero level. In more complex arrangements, the timing synchronization device 40 may divide each period of the periodic waveform into a plurality of preselected reference intervals, and supply a separate timing reference signal upon the occurrence of each of these preselected intervals. The timing reference signals are utilized by the elements of the system 20 to effect changes in visual patterns displayed on the display 36, change colors of the patterns presented on the display, and vary the intensity of the visual patterns presented, for example. Such control is provided over the system bus 34 under the control of the central processing unit 22.

A source of external information or input is supplied to an input device 42. Typically, the external source of information is music, and the input device 42 typically comprises a microphone or other transducer. An analog signal is supplied from the input device 42 to an analysis and converter unit 44. The unit 44 analyzes the analog input from the input device 42 in a preselected manner and supplies an input control signal to the system bus 34. The input control signal supplied to the system bus is related in a preselected manner to the analog input to the unit 44, with the preselected manner of relationship being predetermined by the operation of the analysis and converter unit. In its simplest form, the analysis and converter unit 44 may take the form of a conventional analog to digital converter. In its more complex form, the analysis and converter unit 44 includes one or more selectively controllable band pass filters whose outputs are applied to time averaging circuits, to provide a plurality of signals proportional to the input within selected frequency bands. In addition, information relative to the dominant frequency of the input signal may also be supplied. The more complex form of the analysis and converter unit 44 is disclosed in the article "Speechlab" in *Popular Electronics*, May 1977, p. 43. Regardless of the form of the unit 44, the input control signal which unit 44 supplies to the system bus 34 is a digital signal.

Under control of the central processing unit 22, the digital input control signal from the analysis and converter unit 44 is acted upon or processed in accordance with one or more of the programs stored in the read-write memory 28. Processing the digital input control signals in a manner related to the preselected processing information contained within the progams stored in the memory 28 and under control of the central processing unit, obtains a plurality of display control signals. The display control signals are, of course, related to the digital input control signal from the unit 44 by the selected processing information contained within the programs stored in memory 28. Of course, the program information was derived from the mass storage device 30.

The display control signal is digital in form and typically comprises a plurality of multi-bit words. Typically, the multi-bit display control words forming the display control signals will be recorded in the read-write memory 28 and selectively conducted over the bus 34 under control of the central processing unit 22 to effect the visual display on the display 36. In less complex systems, the multi-bit display control words may directly operatively control the display 36. Thus, the display control signals operatively control the presentation on the display 36.

The following example illustrates how the display control signals are derived from the input to device 42. The selected processing information is typically contained within a computer program. The computer program has been arranged to define a particular visual configuration or pattern to be presented on the display 36. The computer program may also create motion of the configuration on the display or alteration of the shape of the configuration, and the motion or alteration may occur at a selected speed. With any input to device 42, the computer program supplies display control signals which create the programmed configuration and move it at the programmed speed. Alternation of these programmed characteristics may be achieved from further provisions in the program. For example, the speed of movement may be related to the magnitude of the input to device 42. An input data base may be provided as an indication of the prior magnitude of the input, and the direction of movement be controlled by the relation of the instantaneous input magnitude to the data base. Color of the display may be controlled in relation to the input magnitude, with certain input magnitude ranges defining certain colors. Understandably, almost any scheme may be devised for processing the input control signals supplied from unit 44 into desired display control signals through computer programming techniques.

The display 36 is illustratively shown to include four display panel modules 46*a*, 46*b*, 46*c* and 46*d* which have been operatively and physically connected in adjoining relationship. Each display module includes a plurality of individual lighting units 48 arranged in vertical columns and horizontal rows. Each display module 46*a*, 46*b*, 46*c* or 46*d* includes four lighting units 48 in each vertical column and three lighting units in each horizontal row, for example. When operatively connected together, the four display modules provide a display 36 having eight lighting units 48 in each vertical column and six lighting units in each horizontal row. The number of lighting units in each horizontal row and vertical column is not limited in accordance with the concepts of this invention, but it is intended that any number of lighting units may be arranged in any number of rows and columns or in any other desired patterns, if desired. The operative physical and electrical connection of any number of the display panel modules allows the easy and rapid formation of a display 36 of any desired size.

Each of the lighting units 48 within the display system 36 comprises at least one color source, but preferably one color source for each of the three primary colors red, blue and green is provided. The color sources of these primary colors may take the form of colored electrical lamps, and these lamps are energized from the external source of power 38 in accordance with the multi-bit display control word signals operatively supplied from the system bus 34 through a display control and memory unit 50. Specifically, colored sources or lamps could also be used in specific applications, in addition to or as alternatives for the primary color sources.

The display control and memory 50 includes a plurality of control and memory segments, described more fully subsequently. One control and memory segment operatively controls each horizontal row of lighting units 48 within the display 36. The operative control over each horizontal row of the display 36 is illustrated by the group 52 of dashed lines extending from the unit 50 to each horizontal row of lighting units 48.

A serial control interface 54 operatively interconnects the display control and memory unit 50 with the system bus 34. Under the control of the central processing unit 22, the multi-bit display control words are supplied over the system bus 34 to the serial control interface 54. The multi-bit display control words take the form of a plurality of sequentially received multi-bit words, and the serial control interface 54 operatively conducts one bit of each of the multi-bit display control words to each of the control and memory segments within the display control and memory unit 50. Each of the control and memory segments receives one bit of the multi-bit display control word, and each bit of the display control word is utilized in effecting the energization of one lighting unit 48, or of one color source within a lighting unit 48, within each horizontal row. Thus, the bits of each multi-bit display control word supply an operative controlling effect on the lighting units 48 in a vertical column or a portion of a vertical column.

As a relatively simple example of display control achieved by the display control words, assume that the multi-bit display control word derived under control of the central processing unit 22 and supplied over the system bus 34 is an eight bit control word. The serial control interface 54 operatively conducts the eight bit display control word to the display control and memory unit 50 with each bit of the eight bit word received by a separate control and memory segment. The bits of the eight bit display control word are then utilized by the display control and memory unit 50 to effect energization of one vertical column of lighting units 48 in the manner determined by the states of each of the bits within the eight bit control word. For example, assume that the eight bit display control word is 10101010. Assuming further that each display unit contains a single lamp and each lamp is energized by control of a high level bit signal, this particular display control word would cause energization of the first, third, fifth and seventh lighting units in a given vertical column, and the second, fourth, sixth and eighth lighting units would not be energized. This particular display control word can then be positioned in selected locations of the control and memory segments of the unit 50 to operatively control a selected vertical column. Essentially, each bit of the multi-bit display control word affects the energization condition of a lighting unit in a different horizontal row of the display, and each multi-bit display control word controls a whole or partial vertical column of lighting units in the display 36.

A plurality of multi-bit display control words are sequentially applied to the display control and memory unit 50. Each of the sequentially applied multi-bit display control words is serially shifted into the appropriate position within the control and memory segments of the unit 50 for effecting the lighting units in a desired vertical column to achieve the desired pattern at the display 36. Once positioned in the proper preselected locations for effecting the desired display, the unit 50 operatively conducts power from the external power source 38 to energize the lighting units 48. The unit 50 is advantageously arranged to allow the shifting in of new display control words while the information contained within the prior plurality of correctly positioned display control words is effecting the display presentation. Once the new plurality of display control words is correctly positioned within the control and memory segments of the unit 50, the unit 50 operatively energizes the display in accordance with the new pattern. In this manner, the visual condition of the display 36 can be rapidly altered to produce a wide variety of effects without delays between sequential presentations.

A pattern composition unit 56 may be operatively connected to the system bus 34 and controlled by the central processing unit 22 to effect desired combinations and arrangements of display presentations and patterns. The pattern composition unit 56 generally accepts one or more of the display control signals and operates on the display control signals in a predetermined manner to alter or form new display control signals. For example, the pattern composition unit 56 may logically combine one display control signal with a previous display control signal to achieve, in effect, a superposition of two display control signals. A variety of logical operations can be achieved, such as addition, subtraction, multiplication or the like, to advantageously supply new display control signals in a very rapid manner. The new display control signals then may be utilized in the manner generally described to achieve the desired visual display. The pattern composition unit 56 can be utilized in this manner to combine blocks or sequential groups of display control words to effect combinations of whole patterns if desired, as will be described more fully.

Certain of the elements of the display system 20 are described in greater detail below. In addition, certain advantageous alternatives for certain of the elements of the system 20 may be used under selected conditions. These advantageous alternative elements are also described in detail below.

In addition to a conventional ASCII Keyboard, the communication interface 32 may include a variety of other devices for supplying information to the display system 20. For example, the interface 32 may include temperature sensors and the like for modifying the color of the visual display in accordance with the environmental temperature. For example, if the temperature is high, cool colors (blues) might be emphasized, while low temperatures could result in emphasizing colors which have the psychological effect of warmth (reds). Other types of means for supplying information relative to the condition or reaction of the individuals viewing the visual display may also be provided through the communication interface 32.

Figure 2:
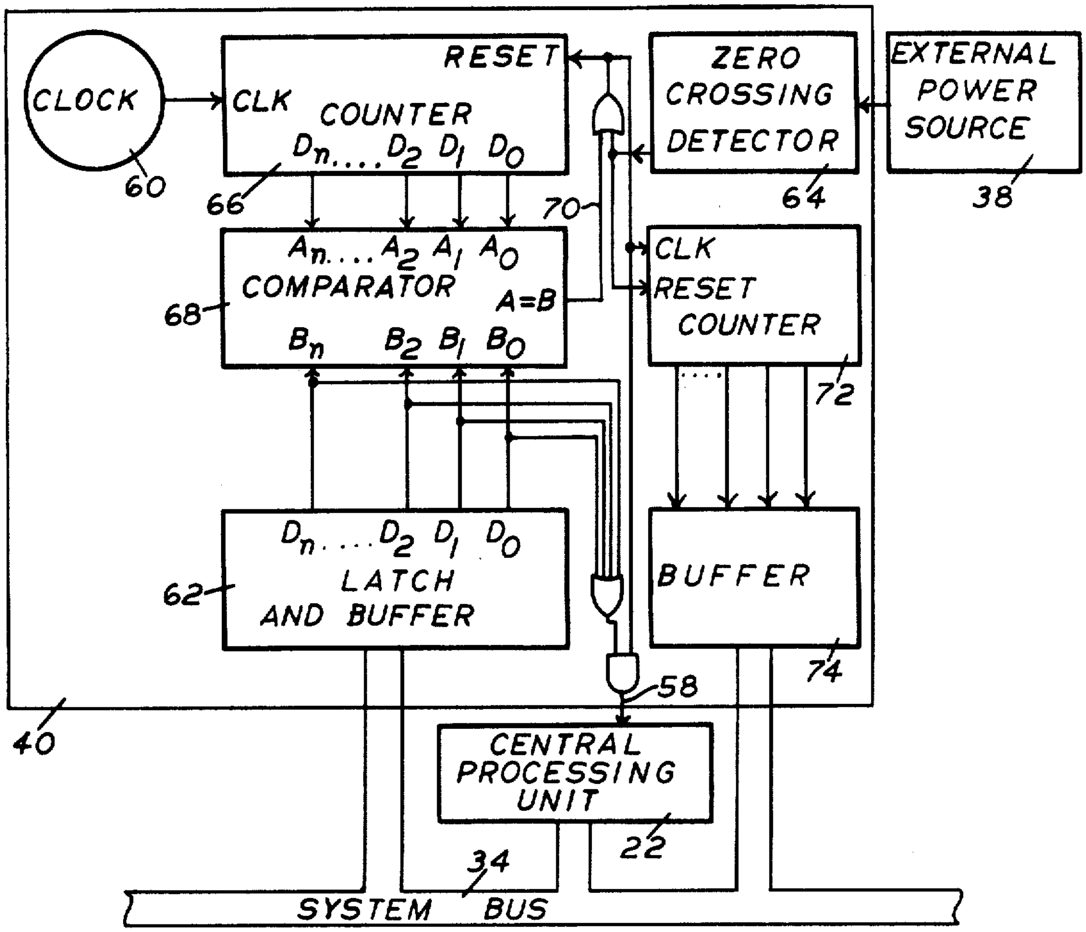
FIG. 2 is a schematic diagram of a timing synchronization device comprising a portion of the display system illustrated in FIG. 1.
Figure 3:
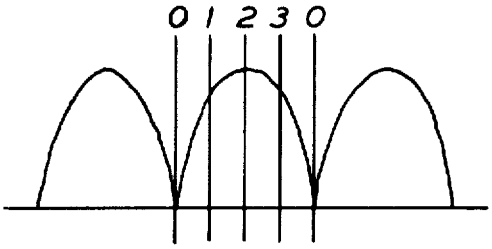
FIG. 3 is an illustrative waveform diagram illustrating exemplary operation of the timing synchronization device shown in FIG. 2.

The timing synchronization device 40 is illustrated in greater detail in FIG. 2. The device 40 provides the central processing unit (CPU) 22 with regular interrupt signals on conductor 58 at predetermined time references in each half-cycle of rectified alternating power supplied by the external power source 38. FIG. 3 illustrates a full wave rectified and unfiltered AC power signal having a periodic characteristic. The time reference signals or interrupts are generated by the device 40 at one or a plurality of intervals throughout each half cycle or period of the external power waveform. The predetermined intervals are preferably equally spaced in time and are determined by effectively dividing a conventional constant frequency source 60 of clock pulses by a preselected number. The preselected number is sent under control of the CPU into a data latch and buffer 62. A conventional zero crossing detector 64 detects the beginning of each period or half cycle of external power, and resets counters 66 and 72 with each zero crossing of the rectified half cycle. The zero crossing detector thus serves to reference the interrupt signals to the beginning of each separate period waveform of half cycle of applied power. After each zero crossing, the number of clock pulses from the source 60 is counted by the counter 66 and signals representative of the count are supplied by counter 66 to a comparator 68. The comparator 68 compares the signals from counter 66 with the signals from the data latch and buffer 62. Upon both input signals to the comparator 68 being equal, a signal is generated on the output conductor 70 which is operatively electrically connected to supply the interrupt time reference signal on conductor 58. The signal on conductor 70 also operatively resets counter 66 to a condition where it can again begin counting clock pulses from the clock source 60. The signal on conductor 70 also operatively increments a counter 72. The process continues in this manner to generate a plurality of interrupt time reference signals throughout each rectified half wave. The counter 72 counts the number of interrupt time reference signals since the last zero crossing of the full wave rectified alternating power waveform. A buffer 74 allows the CPU to obtain information of the number of interrupt time reference signals from counter 74 over the system bus 34.

FIG. 3 illustrates the manner in which the timing synchronization device 40 supplies four equally spaced interrupt signals over each half cycle period of the power waveform. By knowing the frequency of the source 60 of clock pulses, the desired number of interrupts per half cycle, and the frequency of the alternating external power or time duration of each period thereof, the preselected number is derived and sent to the data latch and buffer 62. This number is utilized in the manner described to operatively divide the period of the power waveform into the desired number of interrupt signals. Of course, varying the preselected number sent to the data latch and buffer will vary the number of interrupt signals per period or half cycle of the applied power waveform.

The number and existence of the interrupt reference signals per period is primarily useful in varying the intensity of color sources within each of the lighting units 48 of the display 36, as will be described in greater detail subsequently, although the interrupt signals can be utilized to effect changes in visual displays presented, if desired.

Figure 4:
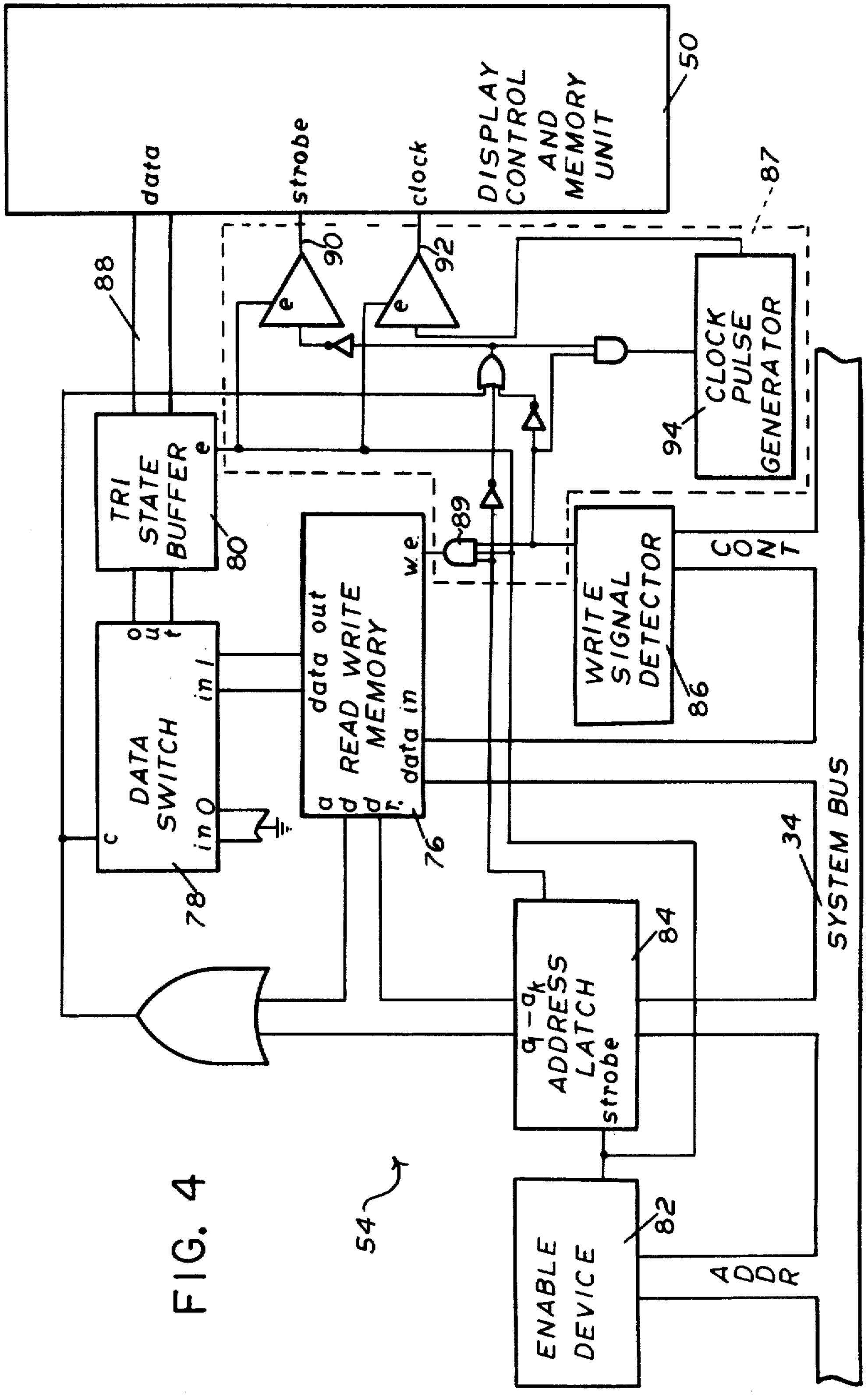
FIG. 4 is a schematic diagram of one embodiment of a serial control interface comprising a portion of the display system illustrated in FIG. 1.

One form of the serial control interface 54 which is operatively directly controlled by the CPU 22 is illustrated in FIG. 4. In this form, the control interface 54 is constantly controlled to supply multi-bit display control words, designated "DATA" in FIG. 4, to the display control and memory unit 50. Under control of the CPU, the multi-bit display control words are transferred from the system read-write memory 28 or CPU accumulator registers over the system bus 34 to a read-write memory 76. The multi-bit display control words are transferred from the output of the read-write memory 76 through a data switch 78 and tri-state buffer 80 to the display control and memory unit 50. Operation of an enable logic device 82, an address latch 84, and a write signal detector 86 operatively control the read-write memory 76 so that the output supplied from memory 76 is either taken from registers or memory elements of the system 20 over the system bus 34, or is taken from the data previously placed in the read-write memory 76. Operative control over elements 82, 84 and 86 by the CPU is determined by address and control information associated with the multi-bit display control words. The address information, designated "ADDR." in FIG. 4, is received by the enable logic device 82, is decoded, and causes the serial control interface 54 to respond to a selected group of consecutive addresses, each of the addresses being associated with one display control word.

With signals representative of the selected group of addresses placed on the system bus 34, the enable logic device 82 operatively causes the address latch 84 to pass the address information through latch 84 and apply the address information to the read-write memory 76. The address and control information received by the enable logic device 82, the address latch 84 and the write signal detector 86 operatively causes these elements to supply three separate control signals to an AND gate 89 of a logical gating arrangement 87. Upon application of three high signals to the AND gate 89, the read-write memory 76 operatively writes the display control word from the system bus 34 into the read-write memory 76 at the address referenced by the output of the address latch 84 and simultaneously supplies the display control word as output. Conversely, upon the occurrence of one low input control signal, the AND gate 89 operatively prevents the read-write memory 76 from writing new display control words into the memory locations referenced by the address information supplied by the address latch 84. In this case, the output of the memory 76 is the previously recorded information at that address. It can therefore be understood that the read-write memory 76 is operatively controlled to supply multi-bit display control words or signals to the unit 50 either in accordance with information which has been previously placed in the read-write memory 76, or in accordance with information currently supplied under the control of the CPU over the system bus 34. Thus, the read-write memory 76 takes information from the system bus and supplies that information to the unit 50 under the control of appropriate address and control signals delivered by the CPU to the elements 82, 84 and 86. Use of the read-write memory 76 in this manner can considerably increase the speed at which display control signals are supplied to the display control and memory unit 50. By easily selecting some of the previously generated signals stored in memory 76, the CPU is not required to regenerate new display control signals in cases of repetitious pattern presentation, for example, thereby supplying a large number of display control signals rapidly.

A logical gating arrangement 87 receives inputs from the devices 82, 84 and 86 and operatively supplies a strobe signal on conductor 90 to the display control and memory unit 50, upon the application of predetermined address and control information to the elements 82, 84 and 86 from the bus 34. For example, if the address and control information is zeros, a strobe signal is supplied on conductor 90. A similar arrangement is utilized in controlling the switch 78 to supply a zero state display control signal to the unit 50, although the control and address information for achieving this result is different than the information for deriving the strobe signal. As will become more apparent from the description of the display control and memory unit 50, display control signals composed totally of zero level bits are useful in creating the visual pattern presented. A clock pulse generator 94 supplies clock pulses to the display control and memory unit 50 over the conductor 92. These clock pulses are useful in controlling operation of the unit 50 as will be described subsequently.

Figures 5, 7A, 7B, 7C:
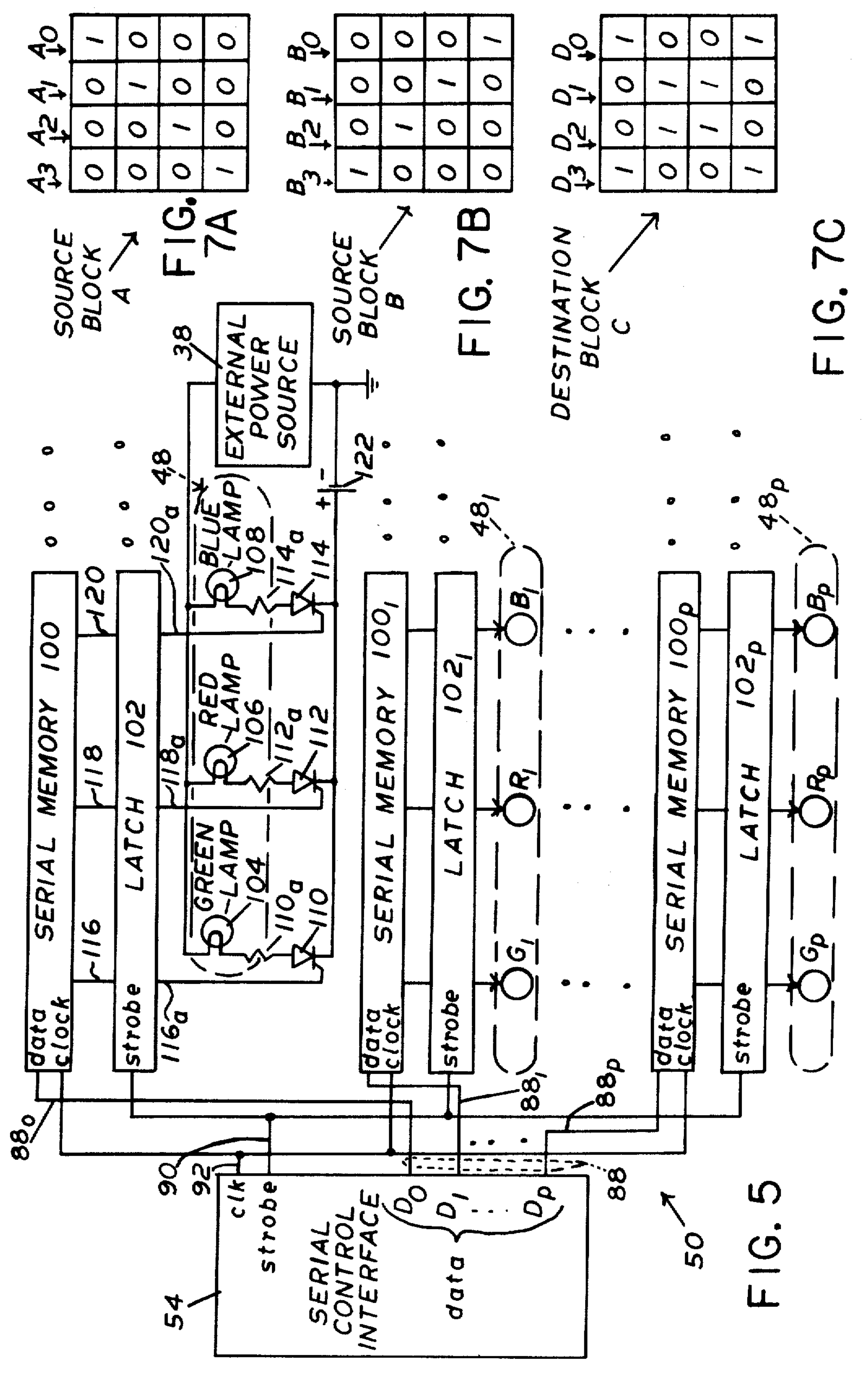
FIG. 5 is a schematic and block diagram illustrating one form of a display control and memory unit comprising a portion of the system illustrated in FIG. 1, including a plurality of control and memory segments. Also shown are display units of the display comprising a portion of the display shown in FIG. 1.
FIGS. 7A, 7B and 7C are illustrations of a plurality of four bit display control words, the display control words of each plurality being located in sequential address positions and each plurality defining a selected block of memory addresses.

One form of the display control and memory unit 50 is illustrated in FIG. 5. As previously discussed, the display control and memory unit 50 includes a plurality of control and memory segments, one of which controls each horizontal row of lighting units 48 in the display 36. Each control and memory segment comprises a serial memory 100 and latch 102. The serial memory may take the form of a conventional shift register, and forms a first level memory for receiving bits of the display control signals supplied over conductors 88 from the serial control interface. The latches 102, under application of a strobe signal applied on conductor 90, supply and hold at their outputs the input signals from the first memory level or serial memory 100. Thus, the latch 102 forms a second level memory for holding and supplying information present at its input at the time the strobe signal on conductor 90 is received. The serial memory 100 and latch 102 are of sufficient length to accomodate all the lighting units 48 in each horizontal row of the display 36. Sufficient length is attained by merely connecting conventional shift registers and latches in serial order. Separate shift registers and latches can be associated with each of the display panel modules 46*a*, 46*b*, 46*c* and 46*d*, and serial connection of the shift registers and latches between adjacent display panel modules is easily achieved.

Each lighting unit 48 preferably includes three primary color sources in the form of a lamp 104 which is green in color, a lamp 106 which is red in color, and a lamp 108 which is blue in color. Power is supplied to the lamps 104, 106 and 108 by the external power source 38, and the conduction of power through the lamps is respectively operatively controlled by SCR's 110, 112 and 114, under the application of appropriate trigger signals. The physical arrangement of the lamps 104, 106 and 108 within each lighting unit is such that the lamps are not separately visible and such that the color emitted from each can be readily mixed. In FIG. 5, only one lighting unit 48 is shown in detail, but all of the remaining lighting units 48 of the display are of the same configuration.

The multi-bit display control words are sequentially applied to the group of conductors 88. The signal level representative of each bit of the display control word is applied over one of the conductors $\mathbf{88}_0$, $\mathbf{88}_1 \ldots \mathbf{88}_p$, with p being one less than the total number of bits in the display control word and also being one less than the total number of horizontal rows within a particular display panel module or of the display itself. Under control of the clock signals supplied on conductor 92 from the serial control interface 54, each serial memory 100 receives bits of information, and these bits are sequentially shifted into memory positions under the influence of the clock signals on conductor 92. For example, the first bit of the first display control word is sent into the first memory location represented by output 116 of serial memory 100 upon the application of a first clock pulse on conductor 92. Upon the application of the second clock pulse on conductor 92, the first bit of the second display control word is sent to the first memory location (116) and the first bit of the first display control word is simultaneously shifted to the second memory location represented by output 118 of the serial memory 100. Upon the application of a third clock pulse, the first bit of the third display control word is placed in the first memory location (116), the first bit of the second display control word is placed in the second memory location (118), and the first bit of the first control word is placed in a third memory location represented by output 120. A similar situation exists for the second bits of each of the multi-bit display control words with respect to the serial memory $\mathbf{100}_1$ and throughout the rest of the control and display segments represented by the serial memories 100 and latches 102. In accordance with this arrangement, corresponding memory locations within each of the serial memories receive bits of the same display control word.

A plurality of display control words are sequentially shifted into locations in the serial memories 100. Once the desired sequence and arrangement of display control display words are present at the desired first level memory locations, a strobe signal is applied by the serial control interface 54 over conductor 90, thereby latching the desired control bits from each serial memory into corresponding second level memory locations within each latch. Signals with each latch are coupled to its ouput, and high signals on the output 116*a*, 118*a* and 120*a* from each latch form trigger signals that are applied to operatively control conduction of the SCR's 110, 112 and 114, respectively. By triggering the SCR's into conduction, the lamps 104, 106 and 108 are energized and a visual display is created in accordance with the plurality of sequentially applied multi-bit display control word signals latched into second level memory locations within the latch. The resistors 110*a*, 112*a* and 114*a* reduce the current surge through the lamps when the SCR's turn on and increase the lifetime of the lamps.

As examples of the types of visual output which may be obtained, the upper lighting unit 48 illustrated in FIG. 5 presents a green color upon the triggering of SCR 110 and energization of the lamp 104. Similarly, red or blue presentations are secured by energization of lamps 106 and 108 respectively. It is also possible that two or more of the lamps may be simultaneously energized to provide a mixing of the primary colors. In this manner, the color presented from the lighting unit 48 is altered to a color other than a primary color.

The outputs from the latches on conductors 116*a*, 118*a* and 120*a* are maintained until application of new input to the latches and until another strobe signal is applied over conductor 90. After the signals from the serial memory 100 have been recorded or latched in the latches 102, new signals can be shifted into the serial memories 100. The new signals are shifted into the appropriate position for presenting the next display pattern prior to the time that a strobe signal is delivered over conductor 90. At the appropriate time, the new signals are latched into the second level memory (102) and the display pattern is changed.

Because the external power source 38 comprises a full-wave rectified, unfiltered, alternating current source, after each half-wave or rectified current, the SCRs 110, 112 and 114 are turned off. The battery 122 or other appropriate device assists in turning off the SCR's by supplying a slight reverse bias or voltage offset to the SCR's. At, or slightly before, the zero crossing of the power waveform, the strobe signal is applied over conductor 90 to trigger the desired display presentation. By varying the number of half cycles in which a particular lighting unit is energized, intensity may be controlled. For example, lighting each lighting unit 48 during four consecutive half-cycles might define maximum intensity, while lighting the lighting unit on every other half-cycle would create a reduced intensity of approximately one-half. Thus, it is apparent that each lighting unit 48 is operatively controlled by at least one bit of a multi-bit display control word signal, and that control by bits by different display control words can result in a variety of colors and intensities. By shifting the positions of the display control word signals and generating new display control word signals, a variety of different visual patterns may be presented on the display 36. Further, these display patterns may be altered slightly or moved in position to create a variety of different presentations and such presentations may simultaneously be varied in color and intensity. Almost unlimited different presentations can be achieved by operation of the system 20.

Although the foregoing description of elements within the system 20 may be effectively utilized to create selected displays, other elements may be advantageously used under certain circumstances as alternatives or in addition to certain of the previously described elements. The alternative or additional elements increase the utility of the present system in a number of certain respects. Each of these additional and alternative elements are described below.

Figure 6:
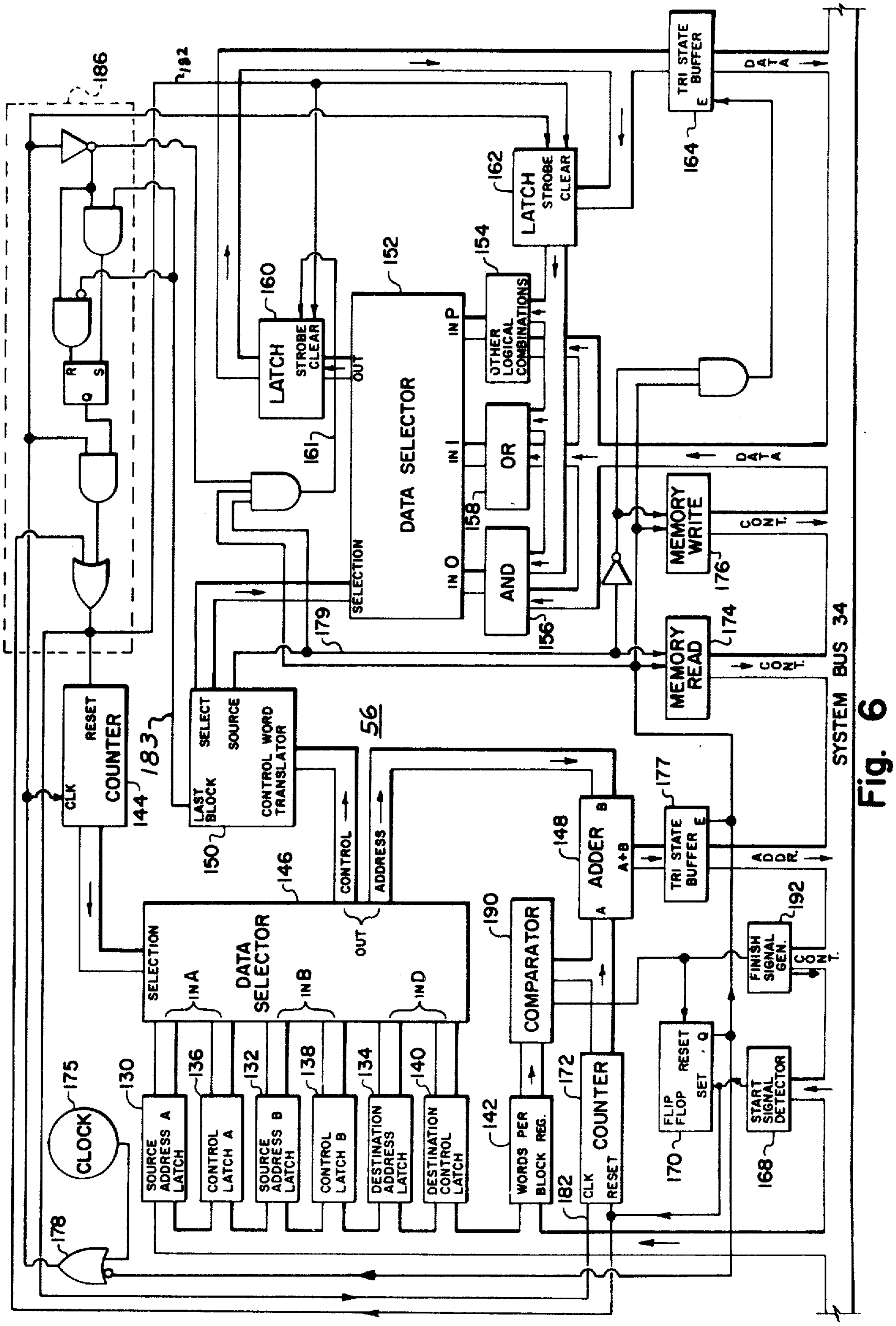
FIG. 6 is a schematic diagram of one embodiment of a pattern composition unit comprising a portion of the system illustrated in FIG. 1.

The pattern composition unit 56 may be advantageously used to provide new patterns based on logical combinations of previously generated patterns. Each pattern is represented by a series of sequential display control words located in a series or block of sequential addresses within the system memory 28. It is the general function of the pattern composition unit 56 to effect a logical operation on display control words at corresponding addresses within two or more blocks of memory and generate a new pattern formed by a series of new display control words. Each of the new display control words is generated by a logical combination of the previously derived two or more of display control words. FIG. 6 illustrates one embodiment of the pattern composition unit 56 which is described in detail subsequently.

FIGS. 7A, 7B and 7C illustrate one simple functional example of the results achievable by operation of the pattern composition unit 56. FIGS. 7A, 7B and 7C also supply general background information for understanding details of operation of the pattern composition unit shown in FIG. 6. FIG. 7A represents a series of four display control words recorded in the block of four sequential memory address locations $A_0$, $A_1$, $A_2$, and $A_3$. The memory locations are in the system memory 28. As a simple example, the four control words in memory address locations $A_0$ to $A_3$ could be supplied to a very simple display (four rows and four columns of lighting units with a single lamp per lighting unit) similar to the display 36 to create a diagonal pattern from lower left to upper right. Each control word operatively controls the lighting units in a vertical column, and each word is associated with one of the addresses $A_0$ to $A_3$. Each bit of the four bit control word controls a lighting unit in a different horizontal row. In this example, the four control words at address location $A_0$–$A_3$ are 1000, 0100, 0010 and 0001. The display control words positioned at sequential memory address locations form a source block A of control words for a first pattern. FIG. 7B illustrates a second source block of four display control words in memory address locations $B_0$, $B_1$, $B_2$, and $B_3$. The source block B of FIG. 7B has the same number of display control words (four) as does the source block A. The display pattern which the source block B of display control words creates is a diagonal from upper left to lower right. Assume, for this simple example, that it is desired to logically combine the pattern provided by source block A shown in FIG. 7A and the pattern provided by source block B shown in FIG. 7B, thereby in effect creating a superposition of the two patterns. Of course, the superposition of the patterns created by source blocks A and B would be two crossing diagonals or an "X". Superposition is obtained from a logical "or" combination of the display control words of the source blocks A and B. This logical "or" combination results in the four new display control words illustrated in FIG. 7C. Generally, it is the function of the pattern composition unit 56 to logically combine the display control words recorded in source blocks, and record the resulting logical combination of display control words in a destination block of memory. Block C defined at sequential destination memory address locations $D_0$, $D_1$, $D_2$, and $D_3$ of system memory represents the destination block, and is shown in FIG. 7C. The new logical combination is supplied from the destination block in system memory 28 under the control of the CPU 22 to create a display pattern in the same manner as other blocks of display control word or words create patterns.

Again, referring to the specific example illustrated by FIGS. 7A, 7B and 7C, the pattern composition unit 56 reads the control word 1000 from system memory address location $A_0$, and logically combines the $A_0$ control word with an initial zero control word 0000. The first display control word is initially combined with a zero control word so that each control word from a source block can be combined one at a time. The logical "or" combination will result in word 1000, and this result will be sent to a temporary storage register. Thereafter, the display control word (0001) from the corresponding address (Bo) of the second source block (B) is read by the pattern composition unit and is logically combined with the control word stored in the temporary storage register (the word 1000). The logical combination, in this example an "or" combination, results in the control word 1001. The new display control word 1001 is then sent to the first memory address location of the destination block (Do) selected by the CPU for receiving the new display control word. Similarly, the control word 0100 at memory address location $A_1$ is combined in an "or" manner with a zero control word and the result 0100 is sent to the temporary result register. The control word 0010 at source location $B_1$ is combined in an "or" manner with 0100 from the temporary result register, and the result, the new display control word 0110, is sent to the destination block memory address location $D_1$ which corresponds to the memory address locations from which the two source control words were obtained. Similarly, the display control words located in other corresponding memory address locations in the plurality of source blocks are logically combined, and the resulting logical combinations, which are new display control words, are sent to a new destination block memory address location corresponding to the locations in the source blocks from which the original display control words were obtained. In this manner, all of the corresponding display control words from the source blocks are logically combined, and the results, the new display control words, are sent to the corresponding memory address locations in a destination block of memory typically within the system memory 28. It is therefore apparent, that the number of sequential memory address locations of all the source and destination blocks must be the same. With this general example of operation in mind, the details of the pattern composition unit may be better understood.

The pattern composition unit 56 is specifically illustrated in FIG. 6. A plurality of begin address source latches 130, 132 . . . operatively receives information identifying the first memory address of each source block, under control of the CPU 22 over the system bus 34. A begin destination address latch 134 operatively receives information identifying the first memory address of the selected destination block, under the control of the CPU 22 over the system bus 34. Any number of begin address source latches are provided, but one begin address latch is required for each different source block of display control words. Associated with each begin source and destination address latch, is one control latch, such as those illustrated at 136, 138 and 140. The control latches are operatively connected to receive combination control signals over the system bus 34 under the control of the CPU 22. The combination control words or signals are received and latched into the control latches. The combination control signals present information relating to the desired type of logical combination of the display control words of the source block with which the particular control latch is associated. The combination control signals also present information regarding the type of block with which the control latch is associated, i.e. a source or destination block, and present information regarding whether the block is a last block which is to be considered during the ensuing combination process. The number of words in each source and destination block is sent to a register 142 under control of the CPU over the system bus 34.

An indexing counter 144 operatively controls a data selector 146 to sequentially connect one of the inputs of the selector 146 to its output. The inputs to the data selector 146 are address information supplied by the begin source and begin destination address latches and the combination control signals supplied by the control latches associated with each address latch. Thus, the data selector 146 conducts each address information signal and its associated combination control signal, in turn, from the input of the data selector 146 to its output under the control of the indexing counter 144. Output from the data selector 146 is the address information signals and combination control signals (respectively designated ADDRESS and CONTROL), and these output signals are supplied respectively to an adder 148 and a control word translator 150. Output from the control word translator 150 controls a data selector 152 in a manner in which a selected input from one of the logical combination devices 154, 156 or 158 is supplied as the output of the data selector 152. Two specific examples of logical combination devices are the AND gate 156 and the OR gate 158, although many other devices could be employed. Output from the data selector 152 is supplied to a latch 160. The latch 160 serves as the temporary result register, and output from the latch 160 is supplied to a latch 162 and a tristate buffer 164. Output from the latch 162 is applied as one input to each of the logical combination devices 154, 156 and 158, thereby allowing the previous result stored in the latch 160 (temporary result register) to be logically combined with the next input display control signal (designated DATA) delivered from the system memory over the system bus and supplied as the other input to the logical combination devices.

Operation of the pattern composition unit 56 of FIG. 6 generally proceeds as follows. The information relating to the beginning addresses of each of the source and destination blocks, and the information regarding the combination control signals for each source block and destination block have previously been sent to the latches 130 through 140 under control of the CPU. Similarly, the number of display control words per block has been sent to the register 142. Thereafter, the CPU operatively delivers a start signal over the system bus to a start signal detector 168. Output from the start signal detector 168 sets a flip flop 170 and resets counter 172 and also operatively resets the indexing counter 144 to zero and clears the output of latches 160 and 162. The output from flip flop 170 enables elements including a memory read generator 174, a memory write generator 176 and a buffer 177, and allows conduction of the clock pulses from a clock 175 through gate 178 to counter 144 and other elements.

After the start signal is detected by detector 168, the address and control information contained within the begin source address latch 130 and the control latch 136 is supplied to the output of the data selector 146. The address information "ADDRESS" is supplied to the adder 148 from the output of the data selector 146. The other output to the adder 148 is received from the counter 172, which has initially been reset to zero by the start signal detector 168. The address information received by the adder 148 from the data selector 146 is added to the output of the counter 172, and the output from the adder 148 is supplied through a tristate buffer 177 to the system bus 34. Thus, the initial memory address location of the first source block is presented to the system bus. The combination control signal "CONTROL" supplied at the output of the data selector 146 is decoded by the control word translator 150, and its output on conductor 179 causes the memory read generator 174 to apply a memory read signal to the system bus 34.

It is apparent that the address information supplied from the tristate buffer 177 and the memory read signal supplied from the memory read generator 174 are applied to the system bus 34. This information is recognized by the system memory, and the display control word recorded within the system memory at the address referenced by the output of the tristate buffer 177 is placed on the system bus 34. This display control word, designated "DATA", is conducted over the system bus to one input to each of the logical combination devices 154, 156 and 158. The output of the temporary result register or latch 160 is present at the other input to the logical combination devices 154, 156 and 158 as a result of conduction through latch 162. Since the latch 160 was initially cleared, it contains a zero control word, and the zero control word is combined with the first display control word at the memory address indicated by latch 130. The logical combination devices perform the logical operations on their inputs, and the output from one logical combination device is coupled through the data selector 152 to the latch 160 in accordance with a signal received from the control word translator 150. Thereafter, the latch 160 receives a strobe signal over conductor 161 and the new temporary result is stored within the latch 160.

With the occurrence of the clock pulse conducted through gate 178, the indexing counter 144 is incremented. The data selector 146 then conducts information from its second input (latches 132 and 138) to the output. The output combination control signal is decoded by the control word translator 150 to effect a selection of the desired logical combination from one of the devices 154, 156 or 158 by operation of data selector 152 and to enable the memory read generator 174. The address information supplied from the data selector 146 is received by the adder 148, and the output of adder 148 is supplied through buffer 177 to the system bus 34. The counter 172 has not been incremented, since counter 172 is incremented only after a word of the last destination block has been accessed. Therefore, the output from counter 172 is still zero and the resulting address placed on the system bus 34 is the begin address of the second source block which is present in begin address latch 132. With the address and memory-read information supplied to the system bus from the buffer 177 and memory read generator 174 respectively, the display control word at the first address of the second source block is retrieved over the system bus and supplied to one input of each of the logical combination devices 154, 156 and 158. The other input to the logical combination devices is supplied through the latch 162, which is the output of the temporary result register or latch 160. Thus, it is apparent that the previous temporary result from latch 160 is combined logically with the new display control word from the next source block by the logical combination devices. The result of the logical combination is supplied to the temporary result register or latch 160 and becomes the new temporary result.

The foregoing operation continues until all of the display control words of the first corresponding addresses of each source block have logically combined the desired result stored in the temporary result register or latch 160. After the last logical combination of the corresponding display control word in the last source block, the indexing counter 144 increments the data selector 146 to couple the last destination address and combination control information from latches 134 and 140 to the output of the data selector 146. The control word translator 150 decodes the combination control information and supplies a signal on conductor 179 to disable the memory read device 174 and enable the memory write generator 176. Simultaneously with the operation of the memory write generator 176, the tristate buffer 164 becomes operative to supply the last logical combination from the temporary result register or latch 160 to the system bus 34. The address information supplied at the output of the data selector 146 has been added with a zero from the counter 172 and supplied through the tristate buffer 177 to the system bus 34. Thus, address information from the tristate buffer 177, memory write information from the memory write generator 176, and the new display control signal resulting from the previous logical combinations of the display control words in the first addresses of each source block are supplied to the system bus 34. The first resultant display control signal is delivered to the first address of the destination block in the system memory 28.

Upon recording of the new display control word in system memory, at the destination address, a signal is delivered on conductor 182 from a gating arrangement 186. The gating arrangement 186 is triggered by the last destination block signal supplied on conductor 183 from the control word translator 150. The counter 172 is also incremented by the signal on conductor 182 making its output a one. The indexing counter 144 is simultaneously reset to zero, and latches 160 and 162 are cleared by a signal on conductor 182. At this point, the display control words in the second address locations in each of the source blocks are logically combined in turn with the results in the temporary result register (latch 160). The operation proceeds in the manner previously described, with the exception that the adder 148 adds a number from the output of counter 172 to the begin addresses of each source and destination block latch. Thus, the output of counter 172 assures that corresponding addresses in each source and destination block are applied as address signals to the system bus. For example, by adding a one to the beginning address, the second address of the block is accessed, since the second address is sequentially positioned in memory location next after the first or beginning memory address location.

This process continues until the output from the counter 172 equals the number of words per block set into register 142. At this point, a comparitor 190 provides an output to a finished signal generator 192. The signal from the finished signal generator 192 signals the CPU 22 that the pattern composition unit 56 has completed the desired combination of display control words and has operatively recorded the new display control words in system memory, at the destination block.

From the foregoing description of elements and their functions, the address latches 130, 132 . . . 134, the data selector 146, and the tristate buffer 177 are operatively connected for addressing selected memory locations. The data selector operatively sequentially addresses corresponding memory addresses in each of the source and destination memory blocks, and the counter 172 increments the address information so the next sequential memory locations in each memory block will be addressed after all corresponding previous address locations in each block have been addressed.

It should be noted that, although address latches have been designated as source or destination address latches, this was done only to aid the description of operation. Any such address latch may be used as either a source address latch, or a destination address latch, depending only on the contents of its associated control latch determined by signals delivered from the CPU 22. It should also be noted that some of the memory blocks other than the last block could also function as destination blocks. In this manner, subcombinations or duplications of certain patterns can be achieved. In addition, the new display control signals can be delivered directly for use to the display control and memory unit 50 over the system bus 34, rather than to a destination block of memory.

The image composition unit 56 described will greatly increase the throughput of a display system. Its functional arrangement of elements allows the display control words to be more rapidly addressed and combined than could be obtained under the direct control of the central processing unit. Also new patterns can be created from preexisting patterns without resort to additional programming.

Figure 8:
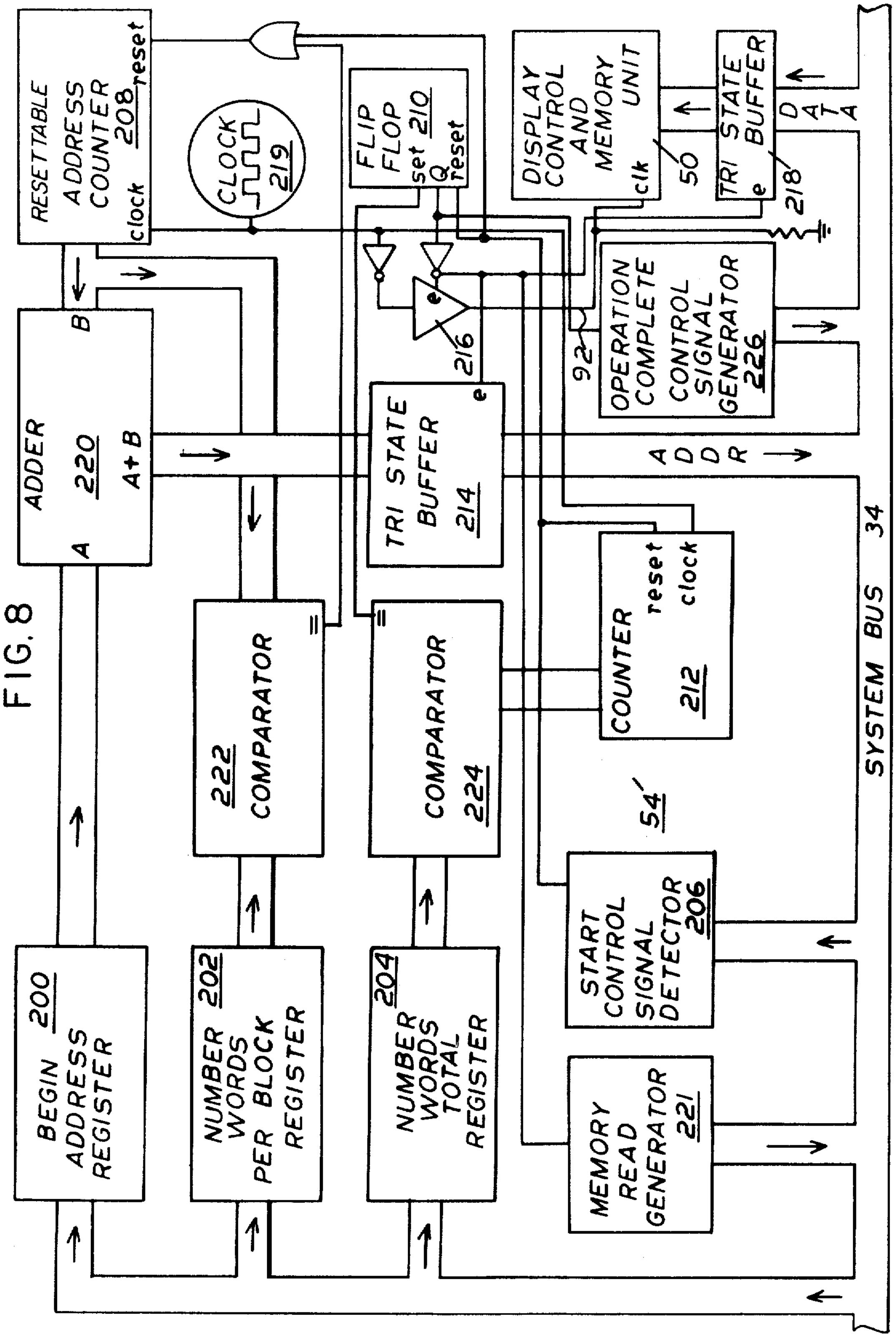
FIG. 8 is a schematic diagram of an alternative form of a serial interface control comprising a portion of the display system illustrated in FIG. 1.

An advantageous form of a serial control interface is illustrated in FIG. 8. A serial control interface shown in FIG. 8 advantageously repetitiously supplies a preselected group of display control words to the display control and memory unit 50. By repetitiously presenting the display control words, many large and varied display patterns can be created.

The serial control interface 54′ shown in FIG. 8 is used in conjunction with the system memory in which a plurality of display control words are recorded in memory locations at sequential addresses. The plurality of sequential display control words define the desired visual pattern to be operatively presented and the sequentially addressed memory locations define a block of memory in which the pattern is recorded. Signals representing the beginning address of the pattern memory block are supplied over the system bus 34 to be received in a begin address register 200 under the control of the CPU 22. Signals representative of the number of display control words within the pattern memory block are supplied to be received in a register 202. Signals representative of the total number of words to be displayed are supplied to be received in a register 204. The total number of words to be displayed may exceed the number of words in the pattern memory block indicating that the display control words of the pattern memory block are sequentially and repetitiously presented until the total number of words is attained. For example, one memory block defining a desired pattern may contain ten words, and the total number of words desired to be displayed may be thirty. In this example, the pattern memory block of ten words would be repeatedly displayed three complete times.

After the described information has been recorded in registers 200, 202 and 204, the CPU delivers a control start signal to a start signal detector 206 over the system bus 34. The output of the detector 206 resets an address counter 208, a flip flop 210, and a total word counter 212. Output from the reset flip flop 210 enables the tri-state buffers 214, 216 and 218, and enables a memory read generator 221. The enabled tristate buffer 216 operatively conducts clock signals from a clock 219 to conductor 92 for delivery to control and memory unit 50. The tri-state buffer 218 connects the display control and memory unit 50 to the system bus 34 to receive display control words (DATA) from the system bus 34 and system memory 28.

Being initially reset to zero, the output from address counter 208 is zero. This zero output is supplied to an adder 220 and a comparitor 222. The initial output of the adder 200 is the begin address present in register 200, since the counter 208 has been reset. Address information (ADDR) from the adder 220 is supplied through the tri-state buffer 214 to the system bus 34. Simultaneously, the system bus 34 receives memory read signals from the memory read generator 221 and the beginning address from the tri-state buffer 214. These signals are received by the system memory and the display control word present at the location addressed is supplied over the system bus, through the enabled tri-state buffer 218, and is moved into the display control and memory unit 50 by the clock pulses on conductor 92. With the first pulse from clock 219, the address counter 208 is incremented and its output is applied to adder 220. The output of adder 220 is increased by one and becomes the next sequential address in the pattern memory block. In other words, the second of the sequential memory locations of the pattern memory block is addressed. The display control word of the next addressed memory location is presented to the display control and memory unit 50 through the tri-state buffer 218. The remainder of the display control words are addressed in sequential order in this manner.

The comparitor 222 receives signals indicative of the number of display control words addressed within the selected pattern block of memory addresses because the output of counter 208 reflects this number. Upon the counter 208 attaining a count indicative of the total number of words in the selected pattern memory block, both inputs to comparitor 222 are equal and an output from the comparitor 222 resets the address counter 208, thus signalling one completed presentation of all display control words in the selected pattern memory block. Each clock pulse from clock 219 is also conducted to counter 212. The output of counter 212 is indicative of the number of display control words addressed, since another display control word is addressed with each clock pulse as a result of the opertive features described. The comparitor 224 compares the output of counter 212 to the selected number of total words registered in register 204. Upon the outputs of counter 212 and register 204 attaining equality, indicating the presentation and display of the total number of desired words, an output of the comparitor 224 sets flip-flop 210. The new output of flip-flop 210 disables the memory read generator 221 and the tri-state buffers 214, 216 and 218. Simultaneously, a complete control signal generator 226 is enabled and a complete signal is supplied on the system bus 34 to signal the CPU 22 of the fact of completion of the pattern. It should be noted that the strobe signal for the unit 50 is derived from signals supplied on the system bus 34 and decoded by an appropriate circuit arrangement similar to that described in conjunction with FIG. 4.

The serial control interface shown in FIG. 8 has one significant advantage of not requiring the central processing unit to operatively generate the selected display control words over and over for repetitious presentation upon the display, thereby increasing the speed of presentation.

Figure 9:
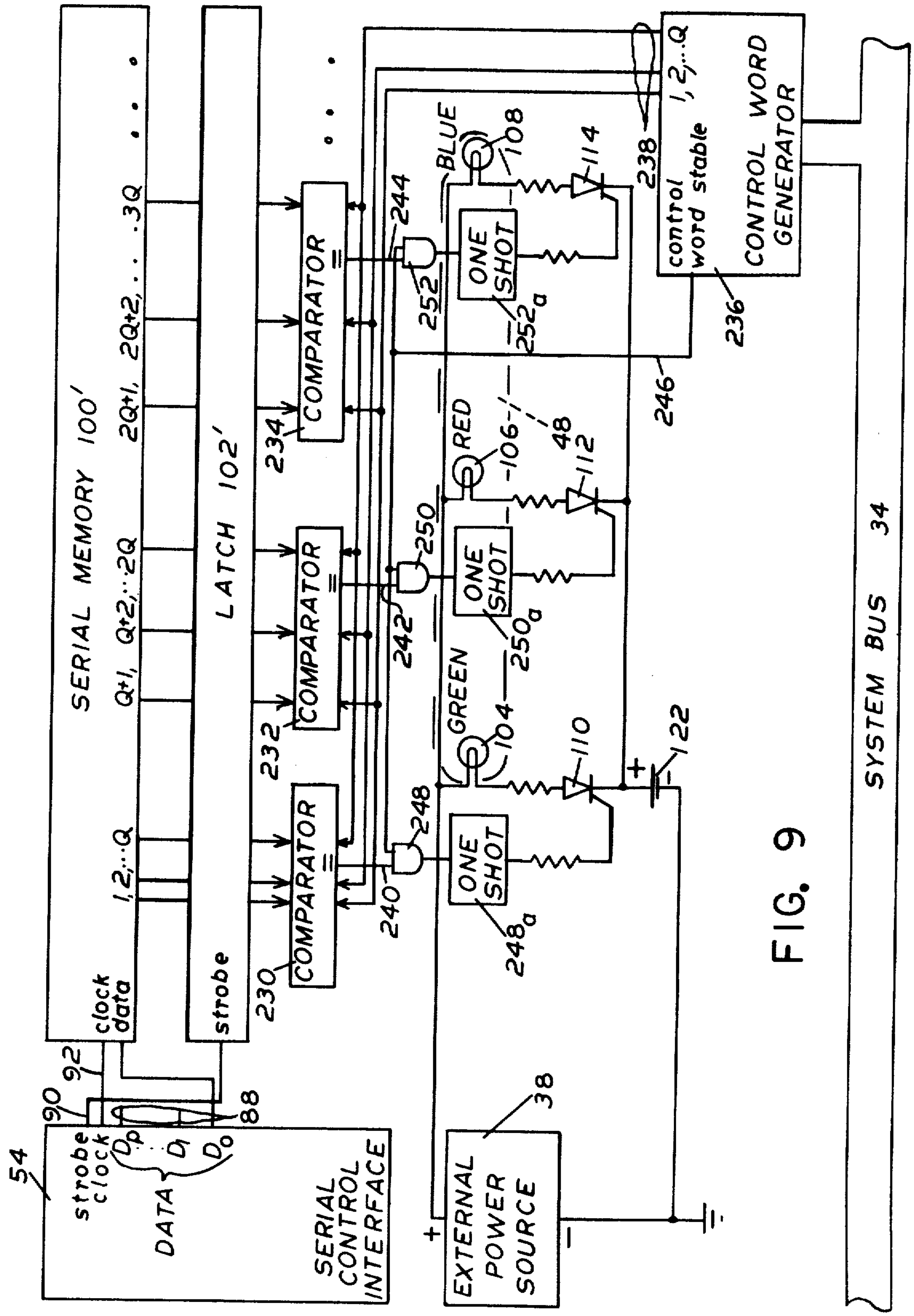
FIG. 9 is another embodiment of a control memory and display unit related to that illustrated in FIG. 5.

One form of displaying control memory unit 50 which allows great selectivity in the intensity of the light emitted from the lighting units 48 is illustrated in FIG. 9. Only one lighting unit 48 is illustrated in FIG. 9, and the reference numbers therein relate to the elements previously described in conjunction with FIG. 5. In the arrangement shown in FIG. 9, a number Q of display control words operatively control each lamp 104, 106 and 108. The serial memory 100' is appropriately lengthened to accommodate Q times the number of lamps controlled thereby. Similarly, the latch 102' accommodates a number of memory locations equal to those of the serial memory. Operation of the serial memory 100' in shifting the sequential display control words into position in accordance with the clock signals supplied on conductor 92 is the same as has previously been described. Similarly, the latching of the display control signals by the latch 102' under application of a strobe signal on conductor 90 is the same as has previously been described.

Each group of Q outputs from the latch 102' is supplied to a single comparitor, comparitors 230, 232 and 234 being illustrated. The high and low signals supplied as input to each of the comparitors from the Q outputs of the latch collectively form an intensity word supplied as input to each comparitor. A control word generator 236 is operatively connected to the system bus 34 and is controlled by the CPU 22. The control word generator 236 supplies a plurality of outputs on conductors collectively referenced 238. The signal levels on conductors 238 are supplied as the second input to each of the comparitors 230, 232 and 234. Under control of the CPU, and at intervals determined by the interrupt signal supplied on conductor 58 from the timing synchronization device 40 (FIGS. 1 and 2), the control word generator 236 is instructed to provide digital signals on its output conductors 238, the number of digital signals ranging from $2^Q-1$ to 0. These digital signals on conductors 238 are compared with the signals supplied as the other input to each of the comparitors 230, 232 and 234. Upon the attainment of equality between the two inputs to a comparitor a signal is supplied on the output conductor from the comparitor output conductors 240, 242 and 244 being illustrated. With each different digital signal generated by the control word generator 236, a signal is supplied on conductor 246 indicating the stability of the output from the control word generator 236. The signal on conductor 246 is supplied to one input of an AND gate, and the other input to the AND gate is the output from an associated comparitor, AND gates 248, 250 and 252 being illustrated. Upon the occurrence of a signal on conductor 246 and on one of the conductors 240, 242 or 244, a one-shot multivibrator 248*a*, 250*a* or 252*a* is triggered. Output from a one-shot multivibrator 248*a*, 250*a* or 252*a* triggers one of the SCR's 110, 112 or 114 respectively. The one-shot multi-vibrators insure that current is delivered for a sufficient time to reliably trigger the SCR's.

It is apparent that the Q number of inputs to each comparitor creates $2^Q$ number of input control states. With this arrangement, each applied power waveform period such as a half cycle may be effectively divided into intervals and the intensity of the lamps controlled in accordance with fraction of the half cycle defined by a number of intervals over which energization occurs. This arrangement achieves a high degree of variation in intensity and control over each of the lamps 104, 106 and 108 and lighting display units 48. Each half cycle of applied power waveform from source 38 is divided into intervals by operation of the timing synchronization device 40 illustrated in FIG. 2, which also delivers interrupt signals to the CPU. In response to the interrupt signals, the CPU controls the control word generator 236 in a selected manner determined by programming information to selectively control the intensity of the lamps 110, 112, 114, etc., throughout the whole display.

Appropriate use of the arrangement illustrated in FIG. 9 allows the display of a number of different separate visual patterns from a single collection of display control words latched into the second level memory or latch 102'. The complete collection of display control words latched into the second level memory is defined by the display control words forming Q separate display patterns. The display control words defining the first of the Q number of separate patterns are recorded in locations within latch 102' identified by positions 1, Q+1, 2Q+1, etc. The display control words defining the second of the Q number of separate patterns are recorded in locations within latch 102' identified by positions 2, Q+2, 2Q+2, etc. Similarly, the display control words defining the last or Qth of the Q number of separate patterns are recorded in locations within latch 102' identified by positions Q, 2Q,3Q, etc. Thus, the signal levels for corresponding bits of Q number of corresponding display control words are supplied as inputs to each comparitor 230, 232, 234, etc. Therefore, each comparitor receives a digital input signal which is defined by the signal levels of corresponding bits of the corresponding display control words of Q different patterns.

As an example, assume that the display control words associated with three separate visual patterns have been recorded in the latch 102'. The first input to each comparitor repesents the signal level of the bit of the display control word associated with the first pattern, the second input to each comparitor represents the signal level of a corresponding bit of the display control word associated with the second pattern, and the third input to each comparitor represents the signal level of the corresponding bit of a display control word associated with the third pattern. Collectively, the three inputs to each comparitor define the binary input signal. Delivery of a binary signal on conductors 238 which corresponds to the binary input signal causes the comparitor to deliver an output signal.

By preselecting the binary signals to be delivered on conductors 238, the three individual patterns can be separately selected, or various logical combinations of the three separate patterns can be achieved. In the previous example, three inputs to each comparitor achieve eight ($2^3$) possible binary control signals which could be applied to the comparitors. A corresponding number of binary signals can be supplied on conductors 238 to compare or match with the input binary control signals to the comparitors. By causing the control word generator 236 to generate four of the eight binary signals which have high levels in their first bit location, all of those comparitors which receive a high level signal on the first input (1, Q+1, 2Q+1, etc.) will trigger their connected SCR's into conduction. The binary control signals can be generated very rapidly, and for all practical purposes, the SCR's will be triggered at approximately the same time. Similarly, the four of the eight possible binary signals having a high signal in the second bit location can be generated quickly to cause those comparitors which have high signals at their second inputs (i.e. 2, 2+Q, 2Q+2, etc.) to trigger their connected SCR's into conduction. Similarly, generation of the four binary control signals having a high signal in the third bit location triggers those comparitors which have high level inputs at the third inputs (i.e. Q, 2Q, 3Q, etc.). In this manner, individual patterns can be selected, or by appropriate use of the binary signals delivered over conductors 238, various logical combinations of the patterns can be provided. In essence, by recording the display control words associated with Q separate patterns in locations within the latch 102', it is possible to select and present at least $2^Q$ separate patterns on the display which have been derived ultimately from the original Q patterns.

Figure 10:
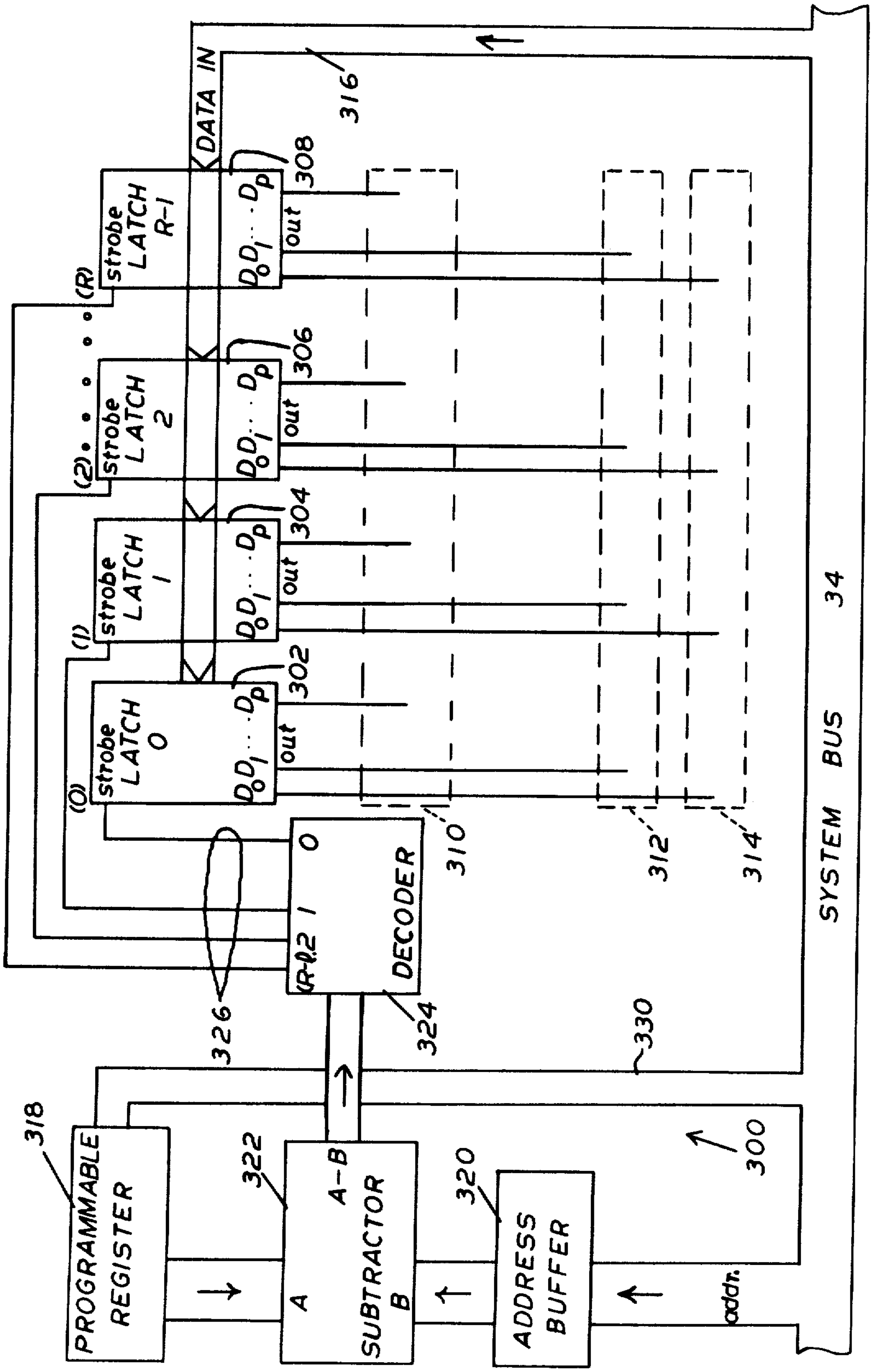
FIG. 10 is a schematic diagram of a random-access control memory and display, which forms an alternative to a portion of the serial control interface and display control and memory unit comprising portions of the system shown in FIG. 1 and illustrated in different embodiments of FIGS. 5 and 9.

Another embodiment of the display system 20 employs a random access control memory and display 300 illustrated in FIG. 10. The random access control memory and display 300 is utilized in substitution for the serial control interface 54 and the display control and memory unit 50 shown in FIG. 1. The random access control memory and display 300 advantageously allows selective application and change of the display control words controlling the state or condition of some of the lighting units 48 of the display 36, while the state or condition of other display control words remains unaltered. This arrangement avoids the necessity of resupplying the complete number of display control words for the whole display when only a portion of the display pattern is to be changed. Display control words are supplied only to those memory locations controlling vertical columns of the display in which a change of state or condition of at least one of the display units in that column is desired. The display control words controlling those columns of display units which are desired to remain in an unaltered state or condition need not be altered.

The random access control memory and display 300 is operatively connected to the system bus 34. A plurality of P bit latches 302, 304, 306 and 308, . . ., are provided, and one of the latches 302-308 controls the corresponding lamps or display units in each vertical column. Each of the latches 302 to 308 provides P number of outputs. The number of P outputs is at least equal to the number of display units 48 within one vertical column of the display panel to which the random access control memory and display 300 is connected. The outputs from the latches 302 to 308 are operatively connected to the second level memories or latches 102 previously described in conjunction with FIGS. 5 and 9. The remainder of the random access display and control memory 300 collectively referenced at 310, 312 and 314 comprises the latches, comparitors, SCRs, gates, etc. of other control and memory segments which have been described in conjunction with FIGS. 5 and 9. It should be understood that the latches 302 through 308 replace the first level memory or shift registers 100 previously described.

Inputs to the latches 302 to 308 are display control words (DATA IN) which are supplied from the system bus 34 over a data bus branch 316. The data bus branch 316 supplies the same display control words to all inputs of all of the latches 302 to 308. The output from one of the latches 302 to 308 is not changed until a strobe signal is applied to that selected latch by a signal delivered over one of the conductors 326. With the application of a strobe signal, the input applied to the latch which receives the strobe is presented at its output and is held at the output of the selected latch. This output signal remains at the selected latch until the application of another strobe signal with different input applied to that latch. All of the latches 302 to 308 operate in a similar manner.

A programmable register 318 is programmed or set with an address. This address can be arbitrarily selected, and as will be seen, the arbitrary selection allows the arrangement shown in FIG. 10 to respond to an operative range of addresses. An address buffer 320 receives address information signals from the system bus 34 under the control of the CPU 22. Output of the address buffer 320 is applied as one input (B) to the subtractor 322. The other input (A) to the subtractor 322 is supplied from the programmable register 318. The address present on the system bus 34 is operatively subtracted from the address programmed into the programmable register 318, and the result of the subtraction (A−B) is applied to a decoder 324. Decoder 324 supplies an output signal over one of R number of output conductors 326 identified by the result of the subtraction.

The decoder 234 is arranged to respond and provide an output signal on one of its outputs only when the operative difference (A−B) between the signal from the programmable register 318 and the address information signal from the buffer 320 falls within the range 0 to R−1. By this arrangement, the address information signal supplied over the system bus 34 is operatively used to address one of the latches 302 to 308, so long as the address information is within the operative range 0 to R−1 less than the address for which the programmable register 318 is set. At the same time an address falls within a selected operative range of 0 to R−1 less than the number programmed into register 318, the display control word associated with the address is applied to the latches 302 to 308 over the data bus branch 316, and the strobe signal supplied over one of the conductors 326 to a selected latch 302 to 308 changes the state of this selected latch.

In operation, assume that the CPU supplies an address to the address buffer 320, and that the address is the same address programmed into the programmable register 318. The output from subtractor 322 is, of course, zero, and the decoder responds to the zero input by supplying a strobe signal over the conductor connected to the decoder 0 output. In this example, the strobe signal is applied to the latch 302. Simultaneously with the CPU supplying the address information over the system bus 34 to the buffer 320, the desired display control word or signal has been supplied over the system bus 34 and the bus branch 316 to all of the latches 302 through 308. However, since only latch 302 receives the strobe signal, only the output of latch 302 is changed. The remainder of the outputs from latches 304 through 308 remain unchanged since they did not receive a strobe signal from the decoder 324. Next, assume that the CPU operatively supplies an address one less than the address in the programmable register 318. The output from the subtractor 322 is one and a strobe signal is supplied by the decoder 324 over its one output conductor to the latch 304. At the same time, the display control word associated with the address one less than the address in the register 318 is applied as input to all latches including the latch 304. The new display control word is latched at the output of the latch 304 while the outputs from the remainder of the latches 302, 306 and 308 remain unchanged. Changes are effected in the outputs of latches 306 and 308 in a similar manner.

It should be noted that a configuration of switches can be used in place of the programmable register to allow selection of the first address of the group of addresses to which a board will react. It should also be noted that a provision may be made through a connecting branch 330 to allow the dynamic change of the contents of the programmable register 318 under control of the CPU 22, or other devices connected to the system bus 34. The latches 302 to 308 are typically contained within the display panel module **46*a* to 46*d* of the dispaly 36 (FIG. 1) to which the random access memory and display 300 is operatively associated. One or more segments or modules of the display can be controlled by this arrangement, by referencing each display module or segment with a selected beginning address placed into the rogrammable register 318. It is apparent that the condition of selected display units 48 may be readily and selectively changed, according to the address and display control word information supplied over the system bus 34. Once the selected changes have been made, the changed information is then utilized to effect the change in the display pattern in accordance with the principles previously described in conjunction with FIGS. 5 and 9. The arrangement described in conjunction with FIG. 10** has the advantage of quickly changing selected segments of the overall pattern displayed without supplying a complete collection of display control words to all the first level memory elements of the display control and memory unit when a partial change in the display pattern is desired. Thus, a partial change of the overall pattern of the whole display presentation or on selected display panel modules can be quickly achieved.

It should be noted that use of the arrangement described in FIG. 10 makes the arrangement of the whole display 36 in a plurality of display panel modules **46*a*-46*d* (FIG. 1**) more convenient. Each panel module could be separately addressed by the setting of its programmable register. Thus, that panel module responds only to its operative range of addresses and to the display control information associated with the selected operative address range, and ignores the address and display control information outside of its operative range. A group of programmable registers can be collectively set so that the operative ranges defined by each are consecutive. For example, the circuit elements associated with the first programmable register respond to the operative range of addresses 0 to R − 1, the circuit elements associated with the second programmable register respond to the operative range of addresses R to 2R − 1, and so on until the circuit elements associated with the last or Yth programmable register respond to the operative range of addresses (Y − 1) R to YR − 1. Similarly, the group of programmable registers can be set to define whole or partial overlapping operative ranges of addresses, whenever desirable. Overlap in the operative ranges is desirable for creating certain types of display pattern presentations.

The concepts and features of the present invention have been described with the degree of particularity presently possible. It should be understood, however, that the specificity of the present disclosure has been made by way of example, and that changes in details of features may be made or become necessary without departing from the spirit of the invention.

I claim as my invention

1. A computer system comprising a central processing means for operatively controlling said computer system, and memory means having a plurality of addressable memory locations for recording and holding signals therein, said processing means operatively addressing said addressable memory locations and controlling said memory means to record signals in the memory locations addressed and to supply signals in accordance with the signals previously recorded in the memory locations addressed, said computer system further comprising, in combination:

means (56) for combining a plurality of pre-existing signals and supplying a new signal formed by the combination of the pre-existing signals, said combining means being operatively connected with said processing means and with said memory means and being operatively controlled by said processing means, said combining means further comprising:

logical combination means (154) for performing a selected logical combination on two input signals applied thereto and for supplying therefrom a new signal representative of the logical combination of the two applied input signals, said logical combination means being operatively connected to receive one input signal from said memory means;

temporary result storage means (160) operatively connected to receive the new signal supplied from said logical combination means, said temporary result storage means also supplying the new signal received as an output signal at an output thereof, the output of said temporary result storage means being operatively connected to supply the output signals therefrom as the other one of the two input signals to said logical combination means;

addressing means (148) operatively connected for addressing selected memory locations of said memory means; and delivery means (164) operatively controlled by said addressing means for conducting the new signal from the output of said temporary result storage means to a selected memory address location addressed by said addressing means.

2. A computer system as recited in claim 1 wherein said addressing means of said combining means further comprises:

first address selection means (130) for addressing a predetermined number of memory locations addressable by the same predetermined number of sequential memory addresses, the predetermined number of memory locations addressed by said first address selection means defining a first memory block;

second address selection means (132) for addressing a predetermined number of memory locations addressable by the same predetermined number of sequential memory addresses, the predetermined number of memory addresses and locations addressed by said first and second address selection means being the same, the predetermined number of memory locations addressed by said second address selection means defining a second memory block; and sequencing means (146) for operatively controlling said second address selection means to address the corresponding memory address in the second memory block after the first address selection means addresses a memory location in the first block.

3. A computer system as recited in claim 2 wherein:

said addressing means of said combining means further comprises third address selection means (134) for addressing a predetermined number of memory locations addressable by the same predetermined number of sequential memory addresses, the predetermined number of memory addresses and locations addressed by said third address selection means being the same number of addresses and locations addressed by each of said first and second address selection means, the predetermined number of memory address locations addressed by said third address selection means defining a third memory block;

said sequencing means operatively controls said third address selection means to address the corresponding memory address in the third memory block after the second address selection means addresses a memory location in the second block; and said delivery means is operatively controlled by said third address selection means for conducting the output of said temporary result storage means to the corresponding memory address location in the third memory block addressed by said third address selection means.

4. A computer system as recited in claim 3 wherein said combining means further comprises:

incrementing means (172) for operatively incrementing said first, second and third address selection means to address the next sequential memory address location in each memory block after all previous corresponding memory address locations have been addressed in each of the memory blocks.

* * * * *